No. 756,208. PATENTED APR. 5, 1904.
W. BÜGLER.
WEIGHING DEVICE.
APPLICATION FILED APR. 23, 1903.
NO MODEL. 2 SHEETS—SHEET 2.
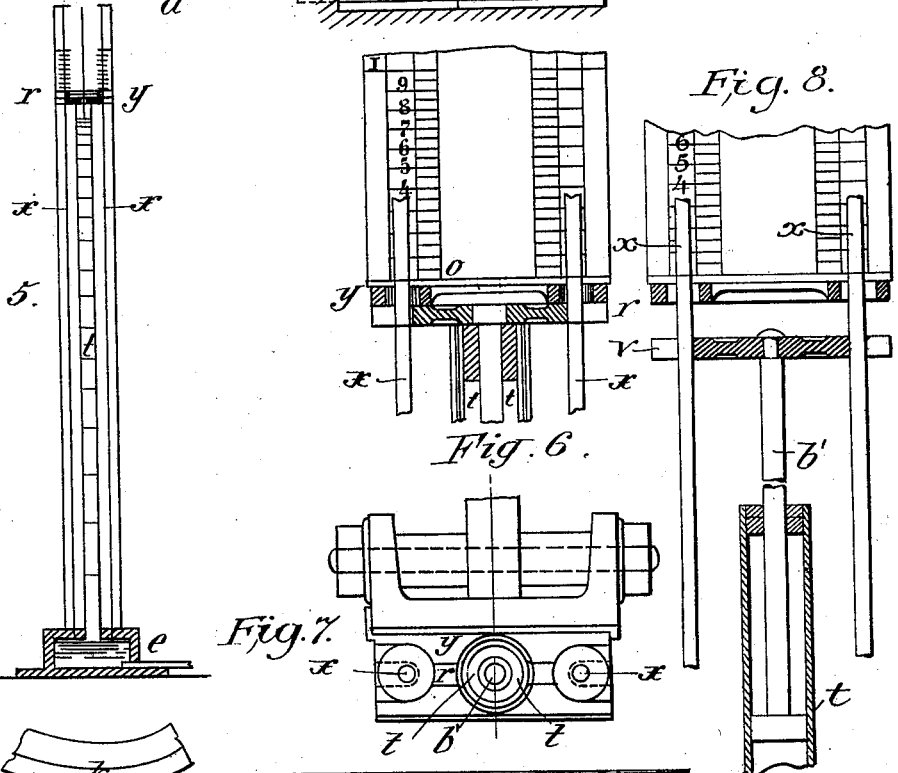

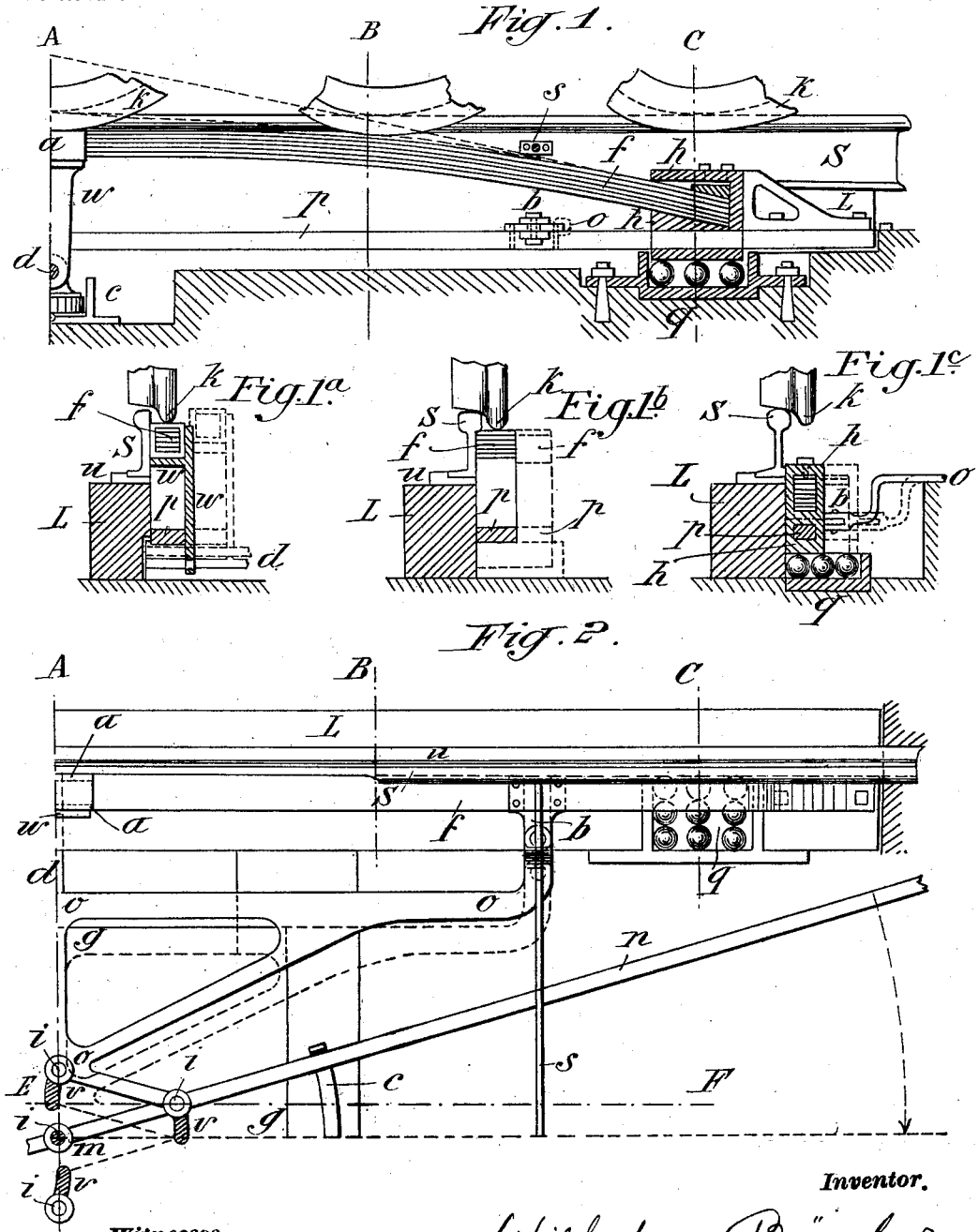

No. 756,208. Patented April 5, 1904.

UNITED STATES PATENT OFFICE.

WILHELM BÜGLER, OF DEGERLACH, NEAR STUTTGART, GERMANY.

WEIGHING DEVICE.

SPECIFICATION forming part of Letters Patent No. 756,208, dated April 5, 1904.

Application filed April 23, 1903. Serial No. 154,001. (No model.)

*To all whom it may concern:*

Be it known that I, WILHELM BÜGLER, a subject of the German Emperor, and a resident of Degerlach, near Stuttgart, Germany, have invented certain new and useful Improvements in Weighing Devices, of which the following is a specification.

This invention relates more particularly to means for weighing cars, and is especially adapted for determining the weights of cars in a train while the same is in motion.

In the accompanying drawings, Figure 1 is a side view of one-half of the weighing device. Fig. 1$^a$ is a sectional view taken on line A of Fig. 1. Fig. 1$^b$ is a section taken on line B of Fig. 1. Fig. 1$^c$ is a section taken on line C of Fig. 1. Fig. 2 is a top plan view of Fig. 1. Fig. 3 is a sectional view through the mechanism for transmitting the pressure. Fig. 4 is a cross-section of the same. Fig. 5 shows a section of the mercury-chamber $e$, the mercury-tube $t$, and the graduations $r y$ of the rods $x$. Fig. 6 shows an enlarged sectional view of the recording apparatus or scale. Fig. 7 shows a plan view of Fig. 6. Fig. 8 is a detail showing the registering mechanism, partly in section.

The weighing device is composed of two sets of leaf-springs $f$, mounted on plates $p$ along the rails, said springs being arranged so that they can be brought into the path of the wheel-flanges $k$ by means of a set of levers $n$. When the car passes onto these springs, the weight is indicated through the deflection of the springs by means of a connecting-rod and a piston in a mercury-cylinder $e$, which communicates with a tube $t$, adjacent to which are graduations $r y$ on rods $x$. The inner portions of the rail head and foot are cut away to allow the springs $f$ to be brought into position for engagement by the wheel-flanges. As it is impractical to provide cross-sleepers for the rails along the length of the plate $p$, they are connected along this distance by brace-rods $s$ and carried at the ends upon saddle-plates $u$ and upon sleepers L, arranged longitudinally of the track and supported upon concrete foundations. The leaves of the springs are held together in the middle by clips $a$, and the ends are securely held in cast-steel boxes $h$ by means of suitable set-screws. The length and number of leaves to the springs are determined by the maximum wheel-pressure, as well as by the amount of deflection which is allowable. The springs $f$ are thrown into position for engagement by means of a lever $n$, which is pivoted at $m$ to a pivot which is cast integral with a cover-plate $g$, which is located in the center of the track and covers the weight-transmitting devices. The bracket $o$ is secured to the plate $p$ at $b$ and is pivoted to the lever $n$, by which it is moved in a lateral direction. These brackets are provided with pins $i$, which engage with slots $v$ of the plate $g$ to guide the brackets in their movement. In order to reduce the friction in moving the lever $n$, it is provided at $c$ with a bearing-roller, and the plates $p$ are provided at $q$ with suitable ball-bearings whereby they may be easily moved. At the middle of the springs are connecting-pieces $w$, secured to the clips $a$ and connecting with a cross-rod $d$. This rod is connected at the middle to a piston playing in a cylinder $e$, which is adapted to contain mercury. A pipe $t$ leads from this cylinder to a convenient point, where it is bent upward to contain a vertical column of the mercury. Adjacent to the pipe $t$ are vertical rods $x$, along which slides an indicator $y$. The indicator has sufficient frictional engagement with said rods so that it will remain in adjusted position. The indicator is moved by a carrier $r$, which is secured to the end of a rod $b'$, having a piston end resting on the mercury in the pipe $t$, and is raised and lowered by the column of mercury in the pipe $t$.

When a weight is brought upon the springs $f$, the springs are flexed, and the amount of depression is indicated by the movement of the piston $e$. It causes the mercury to rise to a greater or less height, and as the column of mercury ascends it carries up the carrier $r$, which in turn lifts the indicator $y$, which will remain in position after the load has passed and the mercury again falls. After the weight has been recorded the indicator is pressed down and is ready for the next load.

It is apparent that the scales may be correctly marked by means of placing standard loads upon the springs.

Having thus described my invention, what I claim, and desire to secure by Letters Patent, is—

1. In a weighing device of the character indicated for railway-cars, the combination of railway-rails, springs $f$; plates $p$, adjacent to the rails, upon which said springs are mounted; means for throwing said springs into and out of position for engagement by the flanges of the wheels of said railway-cars, a mercury-cylinder, a piston in said cylinder, means for connecting said piston with said springs, to be operated thereby, a vertical pipe in connection with said mercury-cylinder, and means for indicating the height to which the mercury is raised in said cylinder, substantially as described.

2. In a weighing device of the character set forth, the combination with the rails provided with cut-away inner portions, of springs adapted to be brought into close proximity with said rails and be engaged by the flanges of passing wheels, and means whereby the amount of depression of said springs may be indicated.

3. In a weighing device for railway-cars, the combination with springs adapted to be thrown into position to be engaged by the flanges of railway-car wheels, plates supporting said springs, brackets secured to said plates, a plate secured between the track-rails provided with slots, pins in said brackets adapted to engage said slots and levers pivoted to said last-named plate adapted to move said brackets in lateral directions, substantially as described.

In testimony whereof I have hereunto set my hand in presence of two witnesses.

WILHELM BÜGLER.

Witnesses:
ERNST ENTENMAN,
O. OBERMEYER.